United States Patent
Li et al.

(10) Patent No.: US 10,218,555 B2
(45) Date of Patent: Feb. 26, 2019

(54) USAGE OF EARLY BITS IN WIRELESS COMMUNICATIONS

(71) Applicants: Qinghua Li, San Ramon, CA (US); Po-Kai Huang, Santa Clara, CA (US); Robert Stacey, Portland, OR (US); Xiaogang Chen, Beijing (CN); Yuan Zhu, Beijing (CN)

(72) Inventors: Qinghua Li, San Ramon, CA (US); Po-Kai Huang, Santa Clara, CA (US); Robert Stacey, Portland, OR (US); Xiaogang Chen, Beijing (CN); Yuan Zhu, Beijing (CN)

(73) Assignee: Intel IP Corporation, Santa Clara, CA (US)

( * ) Notice: Subject to any disclaimer, the term of this patent is extended or adjusted under 35 U.S.C. 154(b) by 214 days.

(21) Appl. No.: 14/753,737

(22) Filed: Jun. 29, 2015

(65) Prior Publication Data

US 2016/0261451 A1    Sep. 8, 2016

Related U.S. Application Data

(60) Provisional application No. 62/129,501, filed on Mar. 6, 2015.

(51) Int. Cl.
*H04L 27/26* (2006.01)
*H04L 5/00* (2006.01)
(Continued)

(52) U.S. Cl.
CPC ........ *H04L 27/2649* (2013.01); *H04L 5/0023* (2013.01); *H04L 5/0053* (2013.01);
(Continued)

(58) Field of Classification Search
CPC ............... H04L 27/2649; H04L 5/0023; H04L 27/2035; H04L 27/0012; H04L 5/0053
See application file for complete search history.

(56) References Cited

U.S. PATENT DOCUMENTS

2012/0177144 A1    7/2012 Lee et al.
2012/0327871 A1    12/2012 Ghosh et al.
(Continued)

OTHER PUBLICATIONS

International Search Report and Written Opinion for International Application No. PCT/US2016/016691 dated Jun. 3, 016 (12 pgs).
(Continued)

*Primary Examiner* — Peter P Chau
(74) *Attorney, Agent, or Firm* — Eversheds Sutherland (US) LLP

(57) ABSTRACT

This disclosure describes methods, apparatus, and systems related to early bit indication system. A device may identify a high efficiency frame in accordance with a high efficiency communication standard, received from a first device, the high efficiency frame including at least in part a legacy signal field and a high efficiency signal field. The device may determine a length field included in the legacy signal field. The device may determine one or more bits included in the length field. The device may determine a repeated high efficiency signal field based at least in part on the one or more bits.

15 Claims, 6 Drawing Sheets

(51) Int. Cl.
*H04L 27/00* (2006.01)
*H04L 27/20* (2006.01)

(52) U.S. Cl.
CPC ...... *H04L 27/0012* (2013.01); *H04L 27/2035* (2013.01); *H04L 27/2613* (2013.01); *H04L 27/2666* (2013.01)

(56) References Cited

U.S. PATENT DOCUMENTS

| | | |
|---|---|---|
| 2015/0009894 A1 | 1/2015 | Vermani et al. |
| 2015/0023449 A1 | 1/2015 | Porat et al. |
| 2015/0117433 A1* | 4/2015 | Zhang ............... H04L 69/22 370/338 |
| 2016/0087766 A1* | 3/2016 | Sun ................. H04L 5/0007 370/329 |
| 2016/0119453 A1* | 4/2016 | Tian .................... H04L 5/04 370/338 |
| 2016/0119933 A1* | 4/2016 | Merlin ............. H04L 5/0048 370/312 |
| 2016/0128057 A1* | 5/2016 | Seok ............... H04L 5/0055 370/329 |
| 2016/0174200 A1* | 6/2016 | Seok ............... H04W 72/04 370/329 |
| 2016/0205569 A1* | 7/2016 | Han ............. H04L 25/03012 370/252 |
| 2016/0227436 A1* | 8/2016 | Vermani ........... H04W 28/06 |
| 2017/0048046 A1* | 2/2017 | Sun ................. H04L 5/0007 |

OTHER PUBLICATIONS

Huawei, 'Preamble structure for 11ax system', doc.: IEEE 802.11-15/01010, Jan. 2015 (19 pgs.).

\* cited by examiner

USAGE OF EARLY BITS IN WIRELESS COMMUNICATIONS

CROSS-REFERENCE TO RELATED APPLICATIONS

This application claims the benefit of U.S. Provisional Application No. 62/129,501 filed Mar. 6, 2015 the disclosure of which is incorporated herein by reference.

TECHNICAL FIELD

This disclosure generally relates to systems and methods for wireless communications and, more particularly, to usage of early bits in wireless communications.

BACKGROUND

Wireless devices are becoming widely prevalent and are increasingly requesting access to wireless channels. A next generation WLAN, IEEE 802.11ax or High-Efficiency WLAN (HEW), is under development. HEW utilizes Orthogonal Frequency-Division Multiple Access (OFDMA) in channel allocation.

DETAILED DESCRIPTION

Figure 1:
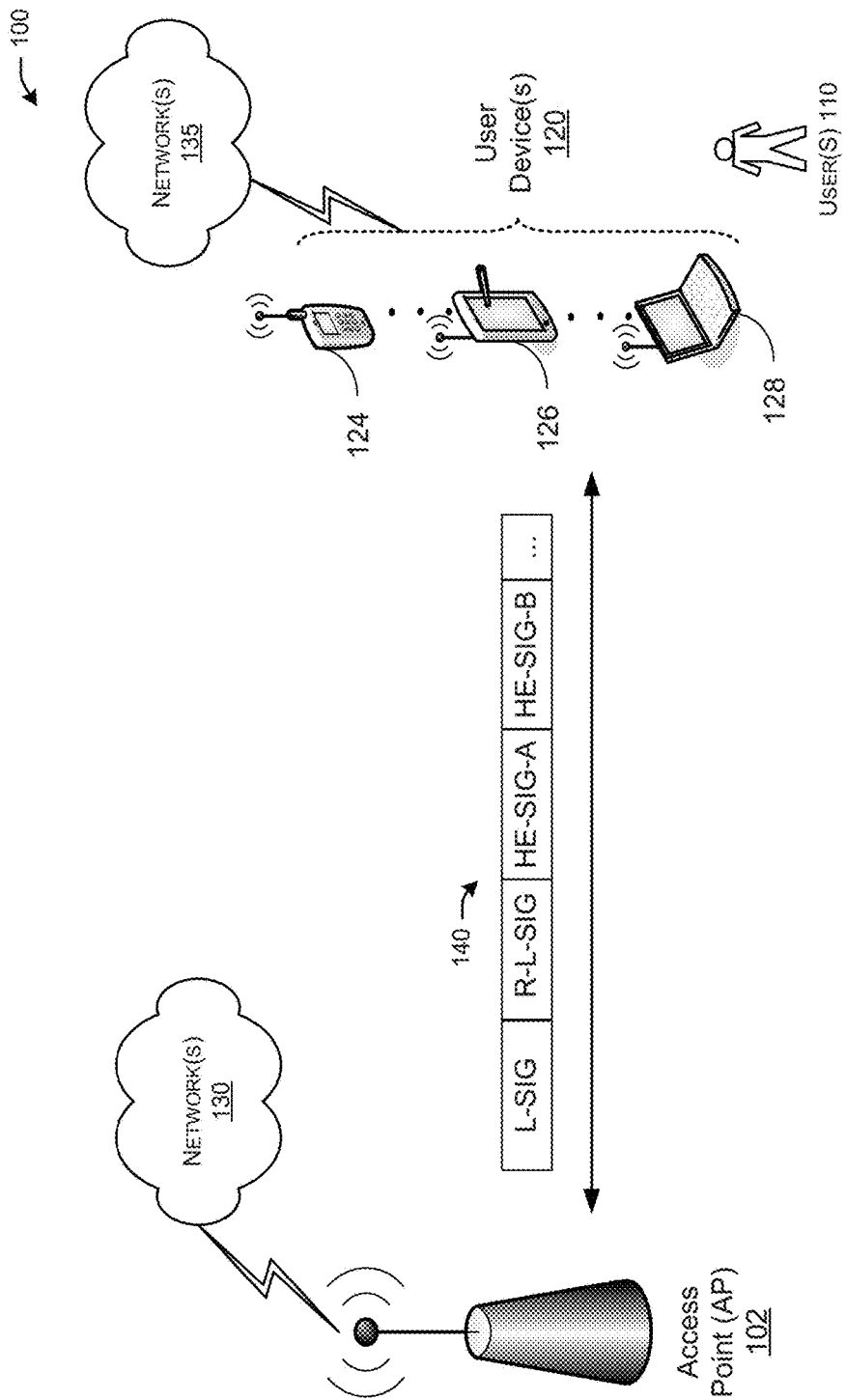
FIG. 1 depicts a network diagram illustrating an example network environment of an illustrative early bit indication system, according to one or more example embodiments of the disclosure.

Example embodiments described herein provide certain systems, methods, and devices, for providing signaling information to Wi-Fi devices in various Wi-Fi networks, including, but not limited to, IEEE 802.11ax (referred to as HE or HEW).

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

One or more data frames may be sent and received by two devices wirelessly communicating with each other. These data frames may be comprised of one or more fields (or symbols) that may be sent from a transmitting device to a receiving device. The format and characteristics of the one or more fields may be based on communication standards, such as the IEEE 802.11 family of standards. In a high efficiency communication (e.g., HEW) between a transmitting device and a receiving device, the one or more fields may be transmitted in time and/or frequency domains. Additionally, the one or more fields may be repeated in the time domain and/or the frequency domain based on transmission requirement of the communication standards. The repetition is meant to enhance the decoding reliability at the receiving device because receiving a field multiple times may increase the accuracy of what is being received. However, the receiving device is unaware of a repeated field until that field is received and decoded. As a result, the repeated field may cause noise and interference since it is not clear what the field is for until being decoded. That is, not knowing which data field is repeated and which subchannels are used, the receiving device may only decode the primary channel in a multi-channel transmission. This may cause wasted opportunity to enhance the reliability of decoding the one or more fields and may cause interferences with other adjacent channels for not knowing of a repeated field before the receiving device receives and decode the field.

Example embodiments of the present disclosure relate to systems, methods, and devices for an early bit indication system that facilitate the use of "early bits." These early bits may be determined by analyzing the length field in the legacy signal field of the one or more data frames communicated between two devices. For example, a predetermined outcome may be based on an operation performed on the length field value. For example, the length field value may be divided by a certain number resulting in a remainder. Based on that remainder, early bits may be encoded to determine whether at least one of the one or more fields is repeated in the time or frequency domains. For example, having a remainder of 1 or 2 may determine whether there is a repetition of a certain field in time and/or frequency domain. In addition, another type of early bits may be encoded based on the orientation of a repeated legacy signal field using a binary phase shift keying (BPSK) modulation. One or more orientations may indicate whether a field is repeated in time or frequency domains. As a result, the receiving device may determine early on using these early bits whether a field is repeated in the time or frequency domain, which may result in enhancing the decoding of that field and minimize the uncertainty of whether a repeated field exist or not.

FIG. 1 is a network diagram illustrating an example network environment, according to some example embodiments of the present disclosure. Wireless network 100 may include one or more user devices 120 and one or more access point(s) (AP) 102, which may communicate in accordance with IEEE 802.11 communication standards, including IEEE 802.11 ax. The user device(s) 120 may be mobile devices that are non-stationary and do not have fixed locations.

Figure 4:
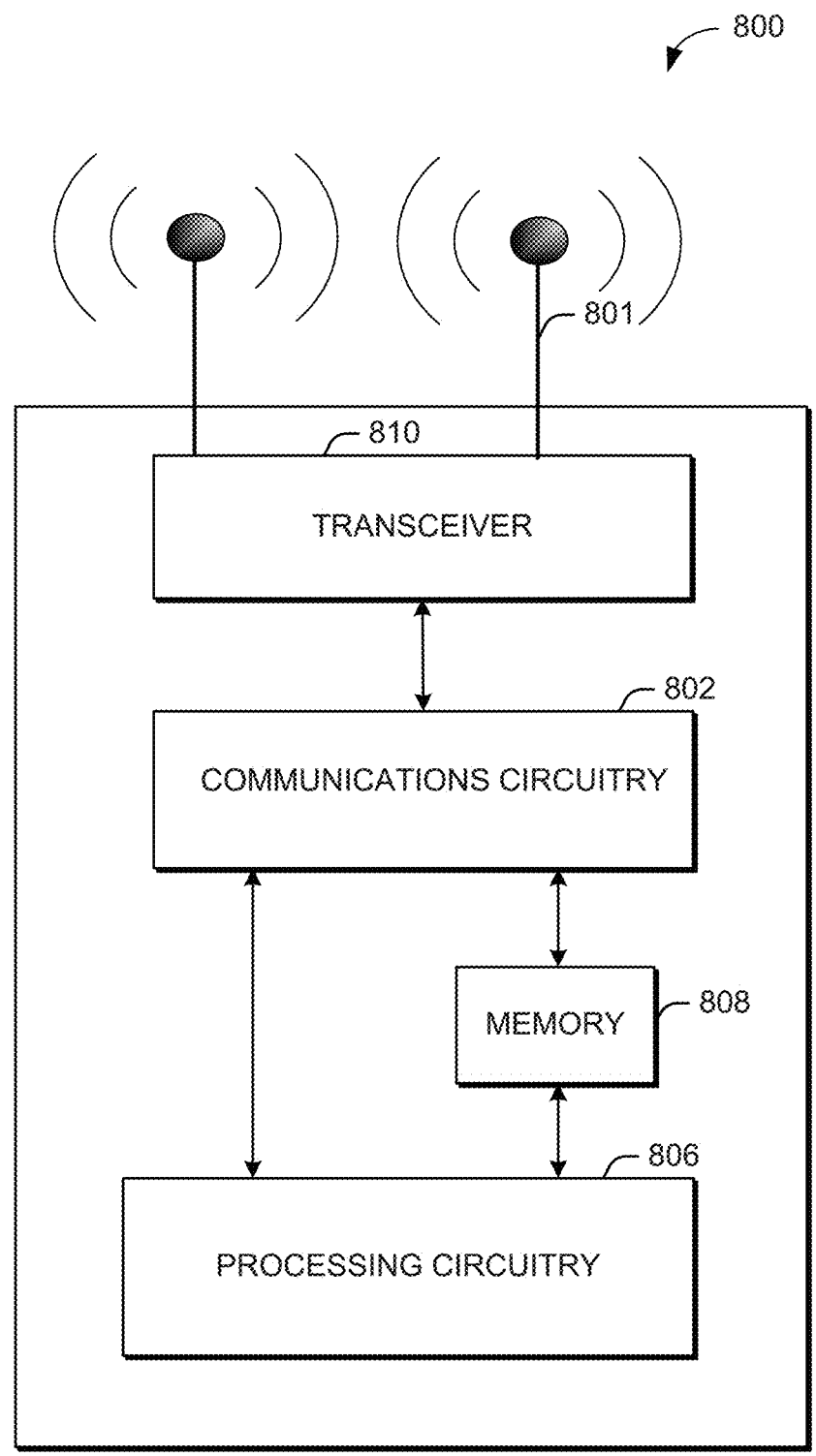
FIG. 4 illustrates a functional diagram of an example communication station that may be suitable for use as a user device, in accordance with one or more example embodiments of the disclosure.
Figure 5:
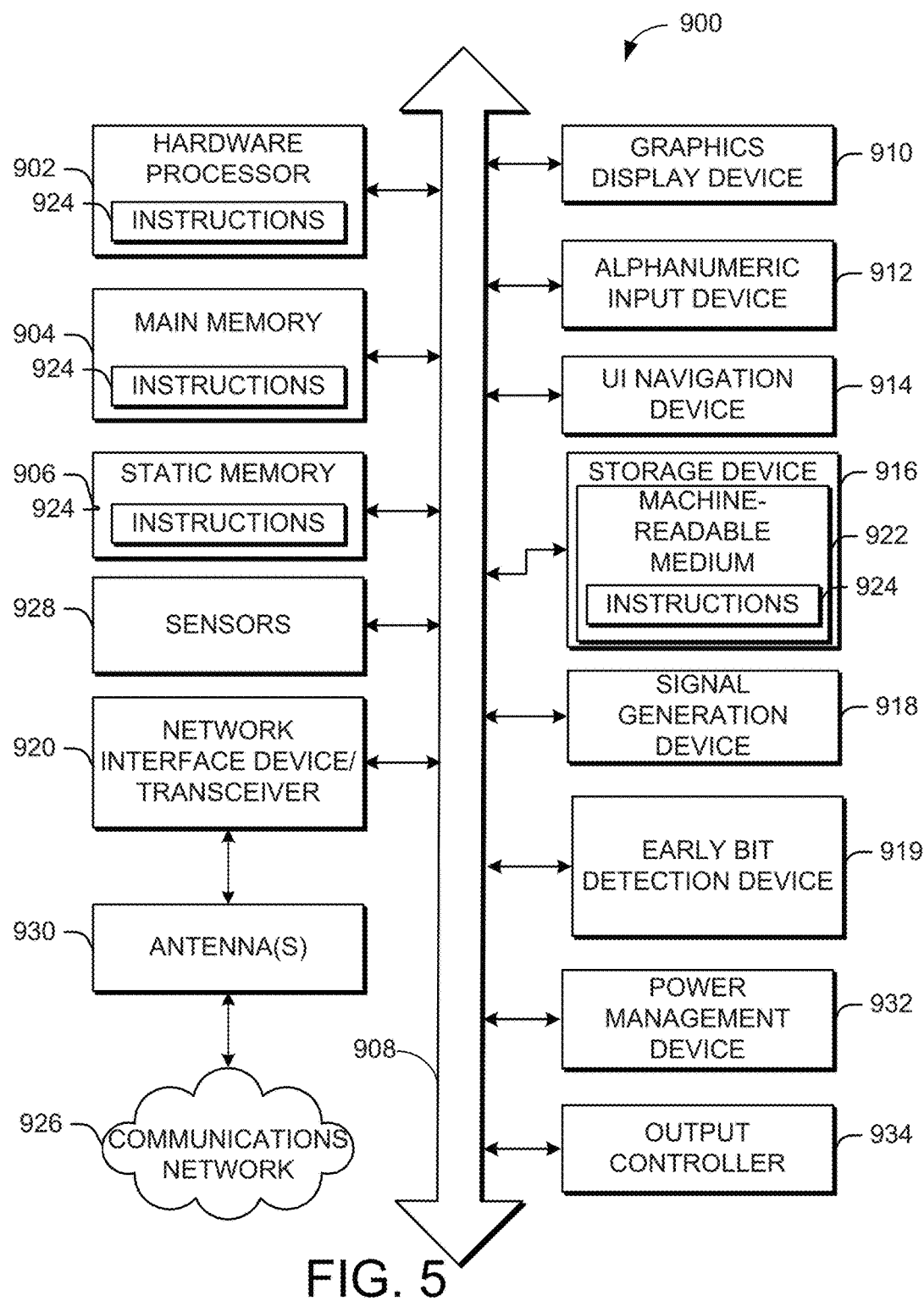
FIG. 5 is a block diagram of an example machine upon which any of one or more techniques (e.g., methods) may be performed, in accordance with one or more embodiments of the disclosure.

In some embodiments, the user devices 120 and AP 102 can include one or more computer systems similar to that of the functional diagram of FIG. 4 and/or the example machine/system of FIG. 5.

One or more illustrative user device(s) 120 may be operable by one or more user(s) 110. The user device(s) 120 (e.g., user devices 124, 126, or 128) may include any suitable processor-driven user device including, but not limited to, a desktop user device, a laptop user device, a server, a router, a switch, an access point, a smartphone, a tablet, wearable wireless device (e.g., bracelet, watch, glasses, ring, etc.) and so forth.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennae. Communications antenna may be any suitable type of antenna corresponding to the communications protocols used by the user device(s) 120 (e.g., user devices 124, 124 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 120.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

When an AP (e.g., AP 102) establishes communication with one or more user devices 120 (e.g., user devices 124, 126, and/or 128), the AP may communicate in the downlink direction by sending data frames. The data frames may be preceded by one or more preambles that may be part of one or more headers. These preambles may be used to allow the user device to detect a new incoming data frame from the AP. A preamble may be a signal used in network communications to synchronize transmission timing between two or more devices (e.g., between the APs and user devices).

In one embodiment, and with reference to FIG. 1, an HEW preamble (e.g., preamble 140) may include one or more fields, such as, a legacy signal field (L-SIG), a repeated L-SIG (R-L-SIG), a high efficiency signal field A (HE-SIG-A) and high efficiency signal field B (HE-SIG-B) 142. It is understood that the above acronyms may be different and not to be construed as a limitation as other acronyms maybe used for the fields included in an HEW preamble.

During a communication between AP 102 and one or more user devices 120 and before receiving the high efficiency signal field A (HE-SIG-A), the receiver (e.g., AP 102 and/or user devices 120) may have already received data fields. These data fields as shown in preamble 140 may be L-SIG and repeated L-SIG (R-L-SIG) fields. Not knowing which data field is repeated and which subchannels are used, the receiving device only decodes the primary channel in a multi-channel transmission. This may cause wasted opportunity to enhance the reliability of decoding the HE-SIG-A and may cause interferences with other adjacent channels due to not knowing what communications channel a repeated data field belongs to before the receiving device starts decoding any received data fields.

In one embodiment, the received data fields L-SIG and R-L-SIG may be utilized to send what will be referred to in this disclosure as "early bits." These early bits may be carried by the length field in the L-SIG field and the piggybacked bits in the repeated L-SIG (R-L-SIG). The piggybacked bits may be sent by modulating the polarity of the R-L-SIG, e.g., based on the orientation of the R-L-SIG symbol. For example, the length field value may be utilized to carry the early bits that may enhance the decoding of the HE-SIG-A field at the receiving device side. The early bits may indicate whether the HE-SIG-A was repeated in time and/or frequency so that the receiver device (e.g., user devices 120) may combine the one or more of the HE-SIG-A and the repeated HE-SIG-A before decoding the HE-SIG-A. This may enhance the reliability of HE-SIG-A by having one or more copies of the HE-SIG-A before decoding. Since the repetition can be in frequency domain, when multiple 20 MHz subchannels are used (e.g., 40, 60, 80, and 160 MHz), the early bits may also indicate whether there is a repetition in frequency. In addition, for every repetition in frequency, the bandwidth may be determined since each frequency repetition indicates the use of an additional subchannel. For example, if the early bits indicate the HE-SIG-A was repeated three times in the frequency domain, the receiver device may determine that the bandwidth of the transmission is 80 MHz, if 20 MHz subchannels are used.

In one embodiment, the early bits may be used to indicate the duration of the packet or the transmission opportunity. The L-SIG field may be used to describe the data rate and length (in bytes) of a data frame, which is used by a receiving device to calculate the time duration of the data frame's transmission. To that extent, the duration of transmission opportunity (TXOP) is indicated by the length field of the L-SIG. In addition, HEW has accuracy of the duration of about 4 μs and HEW may have at least three cyclic prefix durations. The term cyclic prefix refers to the prefixing of a symbol with a repetition of the end. There may be a round error of about 2 μs. Therefore, the early bit in L-SIG may be used for refining the 4 μs resolution such that the reliability of HEW header decoding and accuracy of TXOP duration may be enhanced.

Figure 2:
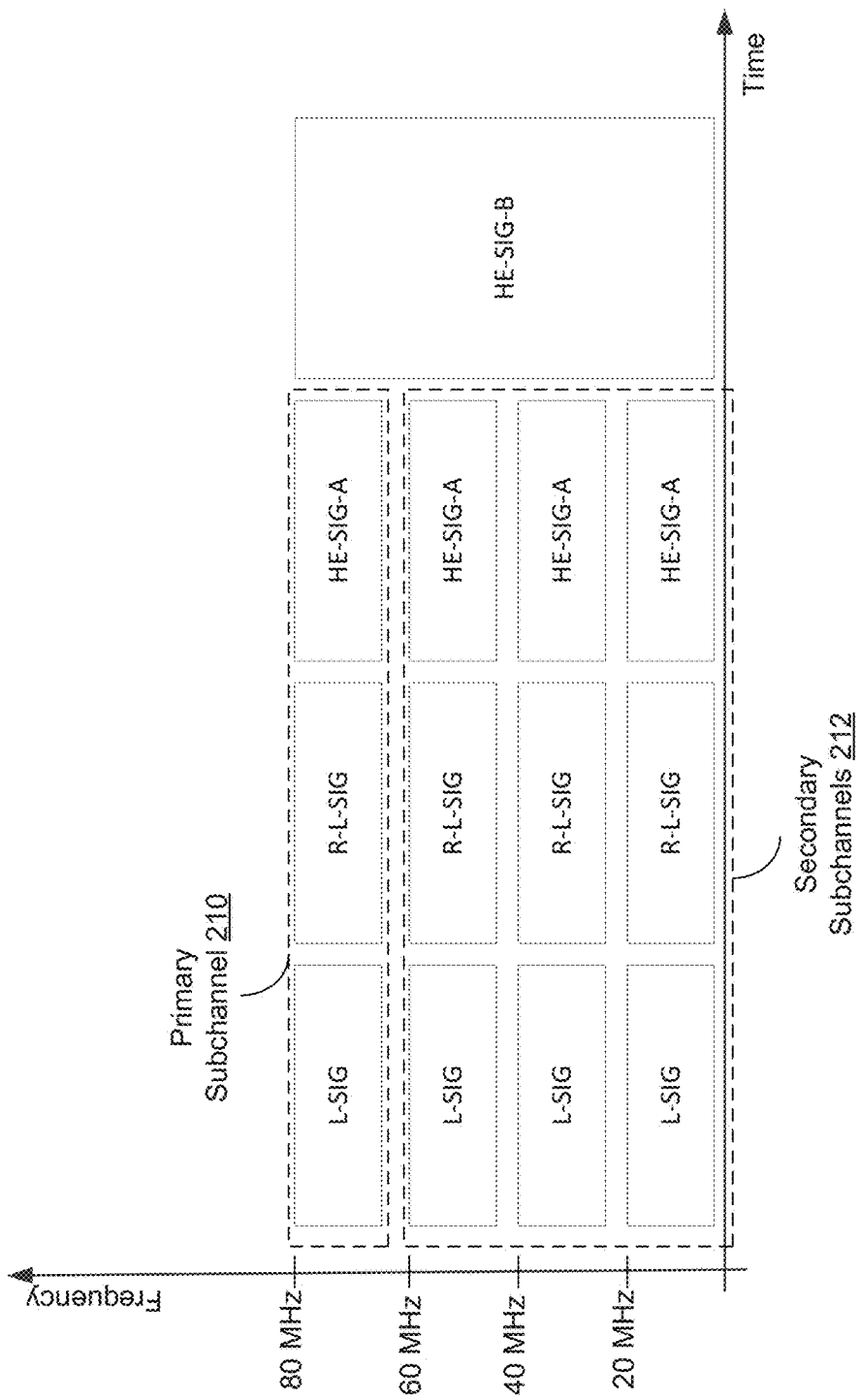
FIG. 2 depicts an illustrative schematic diagram of an HEW frame with multiple subchannels, in accordance with one or more example embodiments of the present disclosure.

FIG. 2 depicts an illustrative schematic diagram of an HEW frame with multiple subchannels, in accordance with one or more example embodiments of the present disclosure.

In IEEE 802.11a, IEEE 802.11n and IEEE 802.11ac packets, the modulation coding scheme (MCS) in the L-SIG may be set to MCS0, that is BPSK code rate 1/2. In addition, the length field may be set to a multiple of 3 bytes such that the packet duration is a multiple of 4 μs.

In one embodiment and as shown in FIG. 2, the bandwidth may be more than 20 MHz because the HE-SIG-A may be repeated in frequency (e.g., secondary subchannels 212). Information in HE-SIG-A sent by AP 102 may need to be reliably decoded at a receiving user device 120. Since the transmission power may be limited by the power amplifier's output power, the power on each subchannel may drop as the bandwidth size increases. The received signal power spread across the subchannels may be combined for reliable decoding. In another example, the same HE-SIG-A symbol may be sent multiple times within the subcarriers of a 20 MHz channel (e.g., primary subchannel 210) or subchannel(s) (e.g., secondary subchannels 212). In yet another example, the repetition of the HE-SIG-A symbol may be across time. Namely, the same HE-SIG-A symbol may be sent multiple times on multiple OFDM symbols (e.g., two adjacent OFDM symbols). All these repetition schemes may need to be indicated such that the receiver may know how to combine the received signals and reliably decode HE-SIG-A. However, if the repetition indication is in HE-SIG-A itself, it may be too late since the HE-SIG-A may not have the various repeated HE-SIG-A available for combining before starting to decode the HE-SIG-A. Therefore, it is desirable that a repetition indication is determined by the early bits such that the repetition pattern may be known by the receiver before decoding HE-SIG-A symbol. Therefore, the early bit in L-SIG may be used for refining the 4 μs resolution such that the reliability of HEW header decoding and accuracy of TXOP duration may be enhanced In one embodiment, early bits carried by the length field in L-SIG may be set using the MCS value and/or the length field. For example, the MCS may be set to MCS0 and the length field may be set to a value not a multiple of 3. When the length value is divided by 3, the remainder may result in either 1 or 2. It is understood that a determination of what each remainder indicates may be predetermined by a system administrator, a user, the network, the user devices, and the access point. The two remainder values (e.g., 1 or 2) may provide the means of having one early bit that could be set based on whether a repetition of one or more fields (e.g., HE-SIG-A) is implemented. For example, dividing the value in the length field of L-SIG by 3, and having a remainder of 1, may indicate that no repetition of the HE-SIG-A field in the frequency domain. A remainder of 2 may indicate at least one secondary subchannel in frequency (e.g., adjacent to the primary channel in FIG. 2). Similarly, the early bit carried by the remainder may be used as a least significant bit of the number of subchannels. In another example, it may be determined that dividing the Length field in L-SIG by 3 and having a remainder of 1, may indicate that there is no repetition of the HE-SIG-A in time. A remainder of 2 may indicate at least one repetition in time. It is understood that the above are only examples of remainder determination and equivalent results and that other results may be assigned based on the remainder value. In another example, the remainder may be used to indicate the case that HE-SIG-B is not presented while HE-SIG-A is not repeated in time domain (e.g., this is the case for single user transmission). In this case, there may be not enough time to adjust the automatic gain control (AGC) after the receiver decodes HE-SIG-A if HE-SIG-B is not presented. The remainder of 1 may be used to indicate this scenario and leave the remainder of 2 open for other indications. The repetition pattern of other fields, such as the L-SIG field, may need to be known for combining the received signals of such field (e.g., L-SIG). If a repeated field (e.g., R-L-SIG) is used, the field (e.g., L-SIG) may be repeated in time domain. In addition, if multiple 20 MHz subchannels are used, the field (e.g., L-SIG) may be repeated in frequency domain.

In another embodiment, other early bits (referred to here as piggybacked bits) carried by the R-L-SIG maybe used. These early bits may be determined based on the polarity of the R-L-SIG. In one embodiment, the subcarriers of R-L-SIG may be divided into groups and each group may carry one piggybacked bit using BPSK modulation over the original L-SIG sequence of that group. In other words, based on the group number and the orientation of BPSK, the piggybacked bits may be coded to mean one or more predetermined settings. For example, a first bit set to 1 and a second bit set to 2 may be set to a predetermined setting.

In another embodiment, the piggybacked bits carried by the R-L-SIG may indicate whether multiple 20 MHz subchannels is used or whether HE-SIG-A is repeated in the time domain. In addition, the number of subchannels may be at least partially indicated by the piggybacked bits.

Since the L-SIG and R-L-SIG may be repeated across 20 MHz subchannels, the receiver (e.g., AP 102 and/or user devices 120) may detect the repetition by checking the correlation among the logarithmic likelihoods (also referred to as log-likelihoods) of code bits on the subchannels. It is understood that likelihood in statistics is used when describing a function of a parameter given an outcome and the log-likelihood is the natural logarithm of the likelihood function. In addition, the detected piggybacked bits may verify the correlation detection results. In one embodiment, the receiver may perform maximum likelihood detection for the bandwidth and the piggybacked bits jointly. The piggybacked bits may be un-coded and designed to be reliably received. Thus, the length remainder and the piggybacked bits may work together to indicate the repetition pattern of L-SIG and HE-SIG-A.

In one embodiment, the length field may be used for enhancing the indication accuracy of TXOP or physical layer convergence protocol (PLCP) protocol data unit (PPDU) duration. It is understood that TXOP is a bounded time interval during which a user device 120 can send as many frames as possible (as long as the duration of the transmissions does not extend beyond the maximum duration of the TXOP). It is also understood that the PPDU is a frame defined by the IEEE 802.11 standards. In IEEE 802.11n and IEEE 802.11ac, the length field in the L-SIG may indicate the duration of the TXOP. The length field in the L-SIG may be used for PPDU duration.—The L-SIG in IEEE 802.11a, IEEE 802.11n, and IEEE 802.11ac may be set as follows. The MCS may be set to MCS0, which carries 3 bytes payload per 4 μs. The length field in byte may be set to a multiple of 3. At least three cyclic prefix (CP) durations may be utilized. This may result in the TXOP duration not always being a multiple of 4 µs.

In one embodiment, the property of the length field not being a multiple of 3 may be used to increase the accuracy of duration indication. A receiver (e.g., AP 102 and/or user devices 120) may know the TXOP duration after decoding L-SIG even if the decoding of HE portion (e.g., HE-SIG-A) fails. In one example, if the TXOP has multiple data bursts (e.g., downlink burst followed by uplink burst), there may be two options. In the first option, the length field in each L-SIG may only cover up to the termination time instant of its PPDU or the termination of its corresponding ACK (or block ACK). In the second option, the length field in each L-SIG may cover up to the termination of the whole TXOP. If the TXOP duration is overbooked using L-SIG length, the hardware of the legacy devices receiving the L-SIG may continue decoding the signal after the L-SIG until the duration specified by the length field expires. Even if the unused portion of the TXOP is freed up by a contention-free end frame, the legacy devices may not receive the contention-free end frame by resetting their AGC because their physical layer are locked to decode the signal after the L-SIG until the length duration expires. For example, each byte may be defined to take is 4/3 µs transmission time using MCS0. The length field in L-SIG may specify a duration that may be a multiple of 4/3 µs is (e.g., LENGTH×4/3 µs), where LENGTH is the length value in the length field.

In another embodiment, it may be defined that a remainder 1 takes 2 µs and a remainder 2 takes 4 µs, if the length field may be wished to be a non-multiple of 3 for differentiating from IEEE 802.11a, IEEE 802.11n and IEEE 802.11ac or other IEEE 802.11 standards. Namely, the total duration may be calculated as $$\left\lfloor \frac{\text{LENGTH}}{3} \right\rfloor \times 4\mu s + (\text{LENGTH} \bmod 3) \times 2\mu s.$$

The specified duration may cover the termination of the TXOP. When IEEE 802.11ax transmitting device (e.g., AP 102 and/or user device(s) 120 of FIG. 1) sets the length field, it may pick a length value such that the exact termination time may be at or sooner than the time specified by the L-SIG. Additional bits in HE-SIG-A (or HE-SIG-B) may further refine the accuracy. Without decoding the HE portion, when an IEEE 802.11ax receiving device decodes the L-SIG, the IEEE 802.11ax receiving device may know that the TXOP may terminate at or before the time calculated from the L-SIG.

Figure 3A:
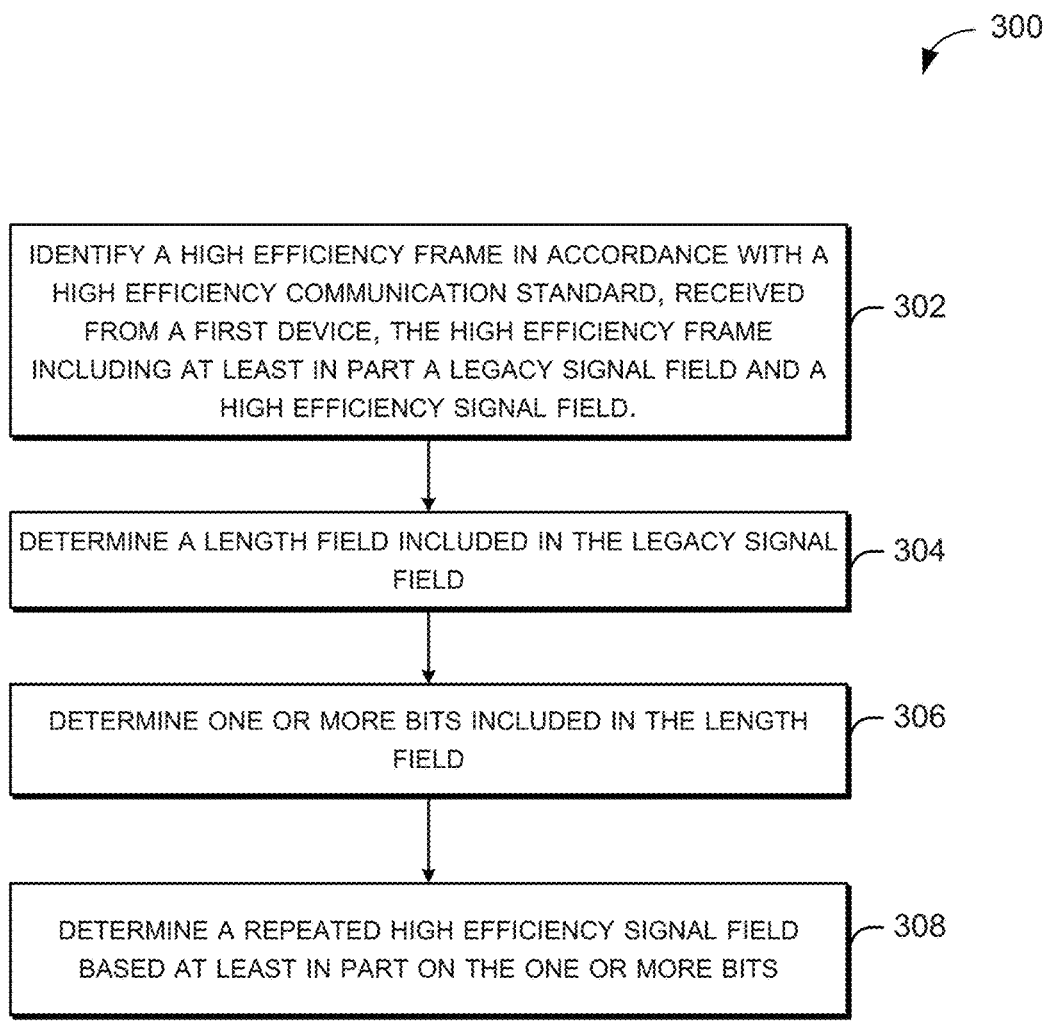
FIG. 3A depicts a flow diagram of an illustrative process for an illustrative early bit indication system, in accordance with one or more embodiments of the disclosure.

FIG. 3A illustrates a flow diagram of illustrative process 300 for an early bit indication system in accordance with one or more embodiments of the disclosure.

At block 302, a user device 120 may identify a high efficiency frame in accordance with a high efficiency communication standard, received from a first device, the high efficiency frame including at least in part a legacy signal field and a high efficiency signal field. For example, a transmitting user device 120 may send a data frame in accordance with HEW such that the data frame may include at least an L-SIG, an R-L-SIG, a HE-SIG-A, a HE-SIG-B, and other fields.

At block 304, the user device 120 determines a length field included in the legacy signal field. For example, the L-SIG field may include a length field among other fields. The length field includes a length value. This length value may determine the length of the data frame.

At block 306, the user device 120 may determine one or more early bits included in the length field. The early bits may be encoded within the length value of the L-SIG. For example, a receiving user device 120 may divide the length value by an integer (e.g., 3) and determine the remainder. The remainder may result in two values, either a 1 or 2 because the length value is set to not be divisible by three (e.g., not a factor of three). These two values (e.g., 1 and/or 2) may indicate any repetition in time or frequency domains of at least one of the signal fields in the data frame received by the receiving user device 120. For example, if the remainder is equal to 1, a high efficiency signal field (e.g., HE-SIG-A) may not be repeated in the frequency domain. However, the high efficiency signal field (e.g., HE-SIG-A) may be repeated in frequency when the remainder is equal to 2. This way, the receiving user device 120 may be able to discern whether the high efficiency signal field is repeated in the frequency domain such that during decoding, the repetition of that field may be used to enhance the reliability of determining that field. Additionally/alternatively, one or more additional bits (e.g., piggybacked bits) may be determined from a repeated legacy signal field (e.g., R-L-SIG) included in the high efficiency frame. For example, the piggybacked bits may be sent by modulating the polarity of the R-L-SIG (e.g., based on the orientation of the R-L-SIG symbol). In that case, the receiving user device 120 may determine the orientation of the R-L-SIG in order to determine how these additional one or more bits (e.g., piggybacked bits) are encoded. The polarity may be an orientation in the BPSK modulation.

At block 308, the user device 120 may determine a repeated high efficiency signal field (e.g., HE-SIG-A) based at least in part on the one or more bits (e.g., piggybacked bits). For example, based on the orientation, the system may indicate whether a high efficiency signal field, such as HE-SIG-A has been repeated in frequency and/or time domains. The repetition of such fields is meant to enhance the decoding reliability at the receiving device because receiving a field multiple time increases the accuracy of what is being received. The receiving user device 120 may then combine the high efficiency signal field (e.g., HE-SIG-A) and the repeated into a combined high efficiency signal field and decode the combined high efficiency signal field.

Figure 3B:
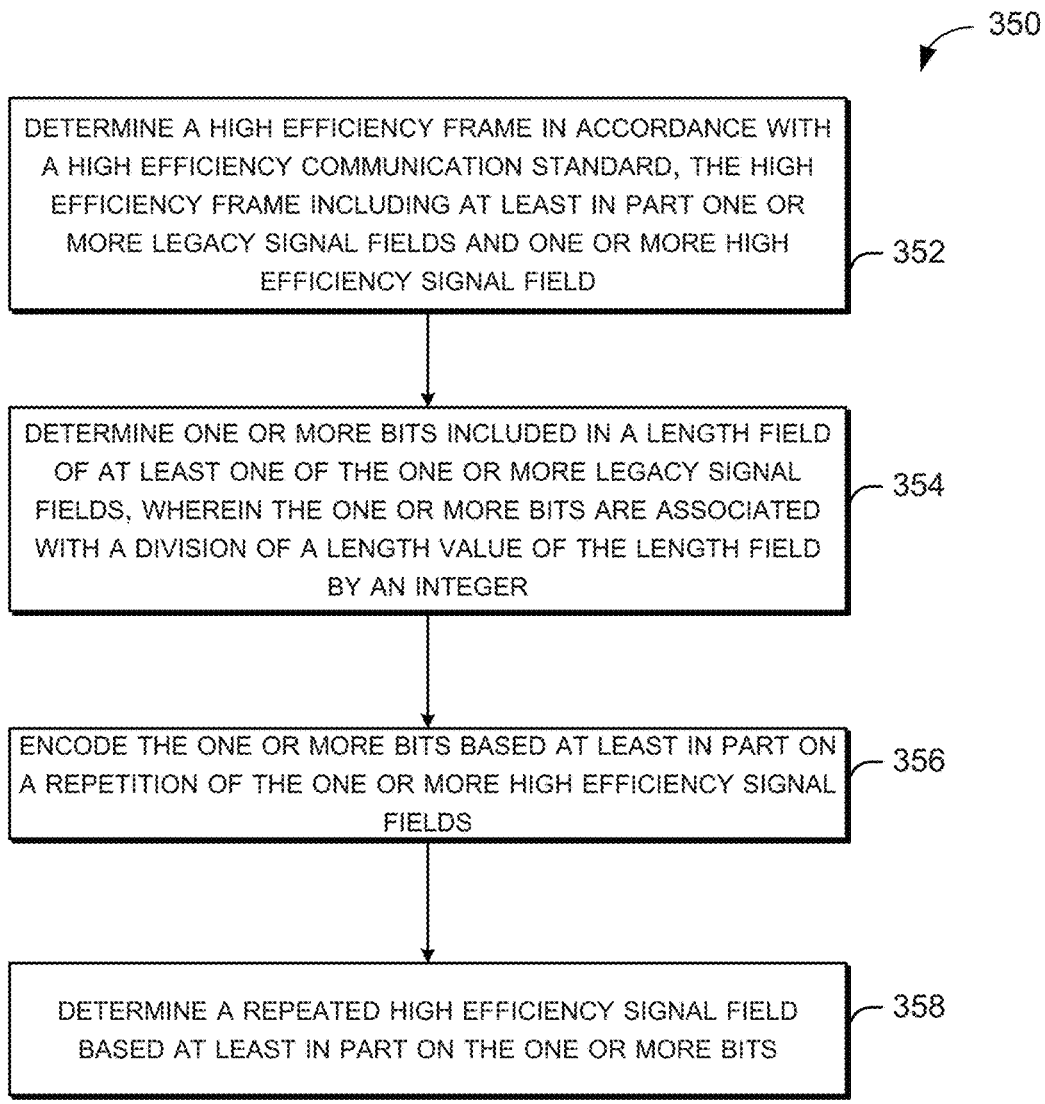
FIG. 3B depicts a flow diagram of an illustrative process for an illustrative early bit indication system, in accordance with one or more embodiments of the disclosure.

FIG. 3B illustrates a flow diagram of illustrative process 350 for an early bit indication system in accordance with one or more embodiments of the disclosure.

At block 352, an AP 102 may determine a high efficiency frame in accordance with a high efficiency communication standard, the high efficiency frame including at least in part one or more legacy signal fields and one or more high efficiency signal field. For example, the AP 102 may prepare a data frame include, among other things, legacy fields (e.g., L-SIG and/or R-L-SIG) and high efficiency signal field(s) (e.g., HE-SIG-A and/or HE-SIG-B). The high efficiency fields may be in accordance with HEW standard.

At block 354, the AP 102 may determine one or more bits included in a length field of at least one of the one or more legacy signal fields, wherein the one or more bits are associated with the division of a length value of the length field by an integer. For example, the L-SIG may include a length field, which in turn may include a length value. The length value may be determined to be not a factor of an integer, for example, the integer being 3. In that case, if the length value is not a factor of 3, there may be two possible remainders (e.g., remainder 1 or remainder 2). These remainders may represent one or more bits encoded in the length field.

At block 356, the AP 102 may encode the one or more bits based at least in part on a repetition of the one or more high efficiency signal fields. The remainders may represent one or more operations, such as the repetition of the one or more high efficiency signal fields (e.g., HE-SIG-A and/or HE-SIG-B. Further, additional bits (e.g., piggyback bits) may further refine the accuracy of decoding one or more of the high efficiency signal fields. Other bits (e.g., piggybacked bits) may be determined from a repeated legacy signal field (e.g., R-L-SIG) included in the high efficiency frame. For example, the piggybacked bits may be sent by modulating the polarity of the R-L-SIG (e.g., based on the orientation of the R-L-SIG symbol). In that case, the receiving user device 120 may determine the orientation of the R-L-SIG in order to determine how these additional one or more bits (e.g., piggybacked bits) are encoded. The polarity may be an orientation in the BPSK modulation.

FIG. 4 shows a functional diagram of an exemplary communication station 800 in accordance with some embodiments. In one embodiment, FIG. 4 illustrates a functional block diagram of a communication station that may be suitable for use as an AP 102 (FIG. 1) or communication station user device 120 (FIG. 1) in accordance with some embodiments. The communication station 800 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 800 may include communications circuitry 802 and a transceiver 810 for transmitting and receiving signals to and from other communication stations using one or more antennas 801. The communications circuitry 802 may include circuitry that can operate the physical layer communications and/or medium access control (MAC) communications for controlling access to the wireless medium, and/or any other communications layers for transmitting and receiving signals. The communication station 800 may also include processing circuitry 806 and memory 808 arranged to perform the operations described herein. In some embodiments, the communications circuitry 802 and the processing circuitry 806 may be configured to perform operations detailed in FIGS. 2-3.

In accordance with some embodiments, the communications circuitry 802 may be arranged to contend for a wireless medium and configure frames or packets for communicating over the wireless medium. The communications circuitry 802 may be arranged to transmit and receive signals. The communications circuitry 802 may also include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the communications circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device may, read-only memory (ROM), random-access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device memory.

FIG. 5 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 900 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (i.e., drive unit) 916, a signal generation device 918 (e.g., a speaker), an early bit detection device 919, a network interface device/transceiver 920 coupled to antenna(s) 930, and one or more sensors 928, such as a global positioning system (GPS) sensor, compass, accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

The early bit detection device 919 may be configured to identify a high efficiency frame in accordance with a high efficiency communication standard. The high efficiency frame may include at least a legacy signal field (e.g., L-SIG and/or R-L-SIG) and a high efficiency signal field (e.g., HE-SIG-A and/or HE-SIG-B). The early bit detection device 919 may be configured to determine the length field included in, for example, the L-SIG field. The length field may include a length value that may determine the length of the data frame.

The early bit detection device 919 may be configured to determine one or more early bits included in the length field. The early bits may be encoded within the length value of the L-SIG. For example, early bit detection device 919 may divide the length value by an integer (e.g., 3) and determine the remainder. The remainder may result in two values, either a 1 or 2 because the length value is set to not be divisible by three (e.g., not a factor of three). These two values (e.g., 1 and/or 2) may indicate any repetition in time or frequency domains of at least one of the signal fields in the received data frame. For example, if the remainder is equal to 1, a high efficiency signal field (e.g., HE-SIG-A) may not be repeated in the frequency domain. However, the high efficiency signal field (e.g., HE-SIG-A) may be repeated in frequency when the remainder is equal to 2. The early bit detection device 919 may determine whether the high efficiency signal field is repeated in the frequency domain. Other bits (e.g., piggybacked bits) may be determined from a repeated legacy signal field (e.g., R-L-SIG) included in the high efficiency frame. For example, the piggybacked bits may be sent by modulating the polarity of the R-L-SIG (e.g., based on the orientation of the R-L-SIG symbol). In that case, the receiving user device 120 may determine the orientation of the R-L-SIG in order to determine how these additional one or more bits (e.g., piggybacked bits) are encoded. The polarity may be an orientation in the BPSK modulation.

The early bit detection device 919 may be configured to determine a repeated high efficiency signal field (e.g., HE-SIG-A) based at least in part on the one or more bits (e.g., piggybacked bits). For example, based on the orientation, the system may indicate whether a high efficiency signal field, such as HE-SIG-A has been repeated in frequency and/or time domains. The early bit detection device 919 may then combine the high efficiency signal field (e.g., HE-SIG-A) and the repeated into a combined high efficiency signal field and then decode the combined high efficiency signal field.

While the machine-readable medium 922 is illustrated as a single medium, the term "machine-readable medium" may include a single medium or multiple media (e.g., a centralized or distributed database, and/or associated caches and servers) configured to store the one or more instructions 924.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments can relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time- Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

According to example embodiments of the disclosure, there may be a device. The device may include at least one memory that stores computer-executable instructions, and at least one processor of the one or more processors may be configured to access the at least one memory, wherein the at least one processor of the one or more processors may be configured to execute the computer-executable instructions to identify a high efficiency frame in accordance with a high efficiency communication standard received from a first device, the high efficiency frame may include at least in part a legacy signal field and a high efficiency signal field. The at least one processor of the one or more processors may be configured to execute the computer-executable instructions to determine a length field included in the legacy signal field. The at least one processor of the one or more processors may be configured to execute the computer-executable instructions to determine one or more bits included in the length field. The at least one processor of the one or more processors may be configured to execute the computer-executable instructions to determine a repeated high efficiency signal field based at least in part on the one or more bits. The device may further include a transceiver configured to transmit and receive wireless signals, an antenna coupled to the transceiver, and one or more processors in communication with the transceiver. The at least one processor of the one or more processors may be further configured to execute the computer-executable instructions to combine the high efficiency signal field and the repeated high efficiency signal field into a combined high efficiency signal field, and may decode the combined high efficiency signal field. The length field may include a length value. The repeated high efficiency signal field may be repeated in at least one of a frequency domain and a time domain. The at least one processor of the one or more processors may be further configured to execute the computer-executable instructions to determine a remainder of a division of the length value by 3, wherein the length value may be not a factor of 3. One or more additional bits are determined from a repeated legacy signal field included in the high efficiency frame. The at least one processor of the one or more processors may be further configured to execute the computer-executable instructions to determine a polarity of the repeated legacy signal field to determine the one or more additional bits, wherein the polarity may be an orientation in a binary phase shift keying modulation. The high efficiency signal field may be repeated in frequency when the remainder is equal to 2. The high efficiency signal field may be not repeated in frequency when the remainder is equal to 1.

In example embodiments of the disclosure, there may be an apparatus. The apparatus may include at least one memory that stores computer-executable instructions, and at least one processor of the one or more processors may be configured to access the at least one memory, wherein the at least one processor of the one or more processors may be configured to execute the computer-executable instructions to determine a high efficiency frame in accordance with a high efficiency communication standard, the high efficiency frame including at least in part one or more legacy signal fields and one or more high efficiency signal field. The at least one processor of the one or more processors may be configured to execute the computer-executable instructions to determine one or more bits included in a length field of at least one of the one or more legacy signal fields, wherein the one or more bits may be associated with a division of a length value of the length field by an integer. The at least one processor of the one or more processors may be configured to execute the computer-executable instructions to encode the one or more bits based at least in part on a repetition of the one or more high efficiency signal fields. The one or more additional bits may be determined from a repeated legacy signal field included in the high efficiency frame. The length value may be not a factor of 3.

In example embodiments of the disclosure, there may be a non-transitory computer-readable medium storing computer-executable instructions which, when executed by a processor, cause the processor to perform operations. The operations may include identifying a high efficiency frame in accordance with a high efficiency communication standard, received from a first device, the high efficiency frame including at least in part a legacy signal field and a high efficiency signal field. The operations may include determining a length field included in the legacy signal field. The operations may include determining one or more bits included in the length field. The operations may include determining a repeated high efficiency signal field based at least in part on the one or more bits. The operations may further include combining the high efficiency signal field and the repeated high efficiency signal field into a combined high efficiency signal field, and decoding the combined high efficiency signal field. The length field may include a length value. The repeated high efficiency signal field may be repeated in at least one of a frequency domain and a time domain. The operations may further include determining a remainder of a division of the length value by 3, wherein the length value may be not a factor of 3. One or more additional bits may be determined from a repeated legacy signal field included in the high efficiency frame. The operations may further include determining a polarity of the repeated legacy signal field to determine the one or more additional bits, wherein the polarity may be an orientation in a binary phase shift keying modulation. The high efficiency signal field may be repeated in frequency when the remainder is equal to 2. The high efficiency signal field may be is not repeated in frequency when the remainder is equal to 1.

According to example embodiments of the disclosure, there may be a wireless communication apparatus. The apparatus may include a means for a means for identifying a high efficiency frame in accordance with a high efficiency communication standard received from a first device, the high efficiency frame including at least in part a legacy signal field and a high efficiency signal field; The apparatus may include a means for determining a length field included in the legacy signal field; The apparatus may include a means for determining one or more bits included in the length field. The apparatus may include a means for determining a repeated high efficiency signal field based at least in part on the one or more bits. The apparatus may further include means for combining the high efficiency signal field and the repeated high efficiency signal field into a combined high efficiency signal field and means for decoding the combined high efficiency signal field. The length field may include a length value. The repeated high efficiency signal field may be repeated in at least one of a frequency domain and a time domain. The apparatus may further include means for determining a remainder of a division of the length value by 3, wherein the length value is not a factor of 3. One or more additional bits may be determined from a repeated legacy signal field included in the high efficiency frame. The apparatus may further include means for determining a polarity of the repeated legacy signal field to determine the one or more additional bits, wherein the polarity may be an orientation in a binary phase shift keying modulation. The high efficiency signal field may be repeated in frequency when the remainder is equal to 2. The high efficiency signal field may be not repeated in frequency when the remainder is equal to 1.

According to example embodiments of the disclosure, there may be a system. The system may include at least one memory that stores computer-executable instructions, and at least one processor of the one or more processors configured to access the at least one memory, wherein the at least one processor of the one or more processors is configured to execute the computer-executable instructions to identify a high efficiency frame in accordance with a high efficiency communication standard received from a first device, the high efficiency frame including at least in part a legacy signal field and a high efficiency signal field. The at least one processor of the one or more processors may be configured to execute the computer-executable instructions to determine a length field included in the legacy signal field. The at least one processor of the one or more processors may be configured to execute the computer-executable instructions to determine one or more bits included in the length field. The at least one processor of the one or more processors may be configured to execute the computer-executable instructions to determine a repeated high efficiency signal field based at least in part on the one or more bits. The system may further include a transceiver configured to transmit and receive wireless signals, an antenna coupled to the transceiver, and one or more processors in communication with the transceiver. The at least one processor of the one or more processors may be configured to execute the computer-executable instructions to combine the high efficiency signal field and the repeated high efficiency signal field into a combined high efficiency signal field and to decode the combined high efficiency signal field. The length field includes a length value. The repeated high efficiency signal field is repeated in at least one of a frequency domain and a time domain. The at least one processor of the one or more processors may be configured to execute the computer-executable instructions to determine a remainder of a division of the length value by 3, wherein the length value is not a factor of 3. One or more additional bits are determined from a repeated legacy signal field included in the high efficiency frame. The high efficiency signal field is repeated in frequency when the remainder is equal to 2. The high efficiency signal field is not repeated in frequency when the remainder is equal to 1. The at least one processor of the one or more processors may be configured to execute the computer-executable instructions to determine a polarity of the repeated legacy signal field to determine the one or more additional bits, wherein the polarity may be an orientation in a binary phase shift keying modulation.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, comprising:
   at least one memory that stores computer-executable instructions; and
   at least one processor of one or more processors configured to access the at least one memory, wherein the at least one processor of the one or more processors is configured to execute the computer-executable instructions to:
   identify a high efficiency frame in accordance with a high efficiency communication standard, received from a first device, the high efficiency frame including at least in part a legacy signal field and a high efficiency signal field;
   determine a length field included in the legacy signal field;
   determine one or more bits included in the length field;
   determine that the high efficiency signal field has been repeated based at least in part on the one or more bits;
   combine the high efficiency signal field and the repeated high efficiency signal field into a combined high efficiency signal field; and
   decode the combined high efficiency signal field based at least in part on the one or more bits.

2. The device of claim 1, further comprising:
   a transceiver configured to transmit and receive wireless signals;
   an antenna coupled to the transceiver; and
   one or more processors in communication with the transceiver.

3. The device of claim 1, wherein the length field includes a length value.

4. The device of claim 1, wherein the repeated high efficiency signal field is repeated in at least one of a frequency domain and a time domain.

5. The device of claim 3, wherein the at least one processor of the one or more processors is further configured to execute the computer-executable instructions to determine a remainder of a division of the length value by 3, wherein the length value is not a factor of 3.

6. The device of claim 5, wherein the high efficiency signal field is repeated in frequency when the remainder is equal to 2.

7. The device of claim 5, wherein the high efficiency signal field is not repeated in frequency when the remainder is equal to 1.

8. The device of claim 1, wherein one or more additional bits are determined from a repeated legacy signal field included in the high efficiency frame.

9. The device of claim 8, wherein the at least one processor of the one or more processors is further configured to execute the computer-executable instructions to determine a polarity of the repeated legacy signal field to determine the one or more additional bits, wherein the polarity is an orientation in a binary phase shift keying modulation.

10. A non-transitory computer-readable medium storing computer-executable instructions which, when executed by a processor, cause the processor to perform operations comprising:
    identifying a high efficiency frame in accordance with a high efficiency communication standard, received from a first device, the high efficiency frame including at least in part a legacy signal field and a high efficiency signal field;
    determining a length field included in the legacy signal field;
    determining one or more bits included in the length field;
    determining that the high efficiency signal field has been repeated based at least in part on the one or more bits;
    combining the high efficiency signal field and the repeated high efficiency signal field into a combined high efficiency signal field; and
    decoding the combined high efficiency signal field based at least in part on the one or more bits.

11. The non-transitory computer-readable medium of claim 10, wherein the length field includes a length value.

12. The non-transitory computer-readable medium of claim 11, wherein the computer-executable instructions cause the processor to further perform operations comprising determining a remainder of a division of the length value by 3, wherein the length value is not a factor of 3.

13. The non-transitory computer-readable medium of claim 12, wherein one or more additional bits are determined from a repeated legacy signal field included in the high efficiency frame.

14. The non-transitory computer-readable medium of claim 13, wherein the computer-executable instructions cause the processor to further perform operations comprising determining a polarity of the repeated legacy signal field to determine the one or more additional bits, wherein the polarity is an orientation in a binary phase shift keying modulation.

15. The non-transitory computer-readable medium of claim 10, wherein the repeated high efficiency signal field is repeated in at least one of a frequency domain and a time domain.

* * * * *